Oct. 11, 1960 M. MENDELSOHN ET AL 2,956,100
ELECTRIC BATTERY STRUCTURE
Filed Oct. 12, 1955

INVENTORS
MEYER MENDELSOHN
CARL HOROWITZ
BY J. B. Burke
ATTORNEY

United States Patent Office 2,956,100
Patented Oct. 11, 1960

2,956,100

ELECTRIC BATTERY STRUCTURE

Meyer Mendelsohn, New York, and Carl Horowitz, Brooklyn, N.Y., assignors to Yardney International Corp., New York, N.Y., a corporation of New York Filed Oct. 12, 1955, Ser. No. 540,099

8 Claims. (Cl. 136—146)

Our invention has for its object improvements in electrical accumulators. One object of the invention is to provide an improved separator for electrodes in an accumulator.

A further object of the invention is to provide a battery separator composed of a polymer of high molecular weight having a predetermined degree of crystallinity and a minimum amount of hydrophilic groups.

Yet another object is to provide a battery cell with a unique inter-separator to improve its stability, efficiency and internal resistance characteristics.

Figure 1:
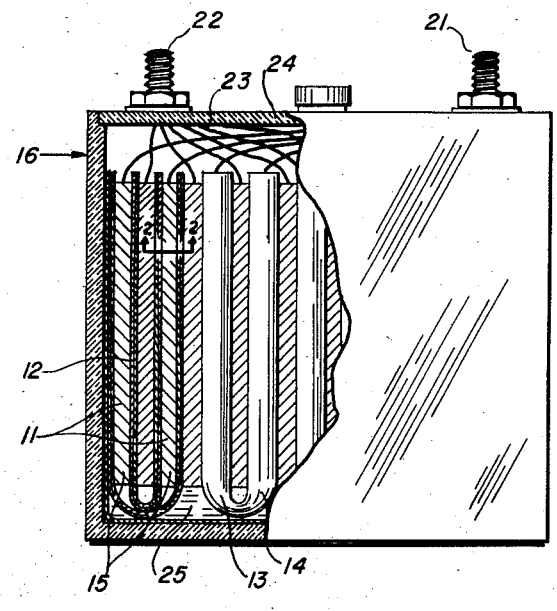
Figure 2:
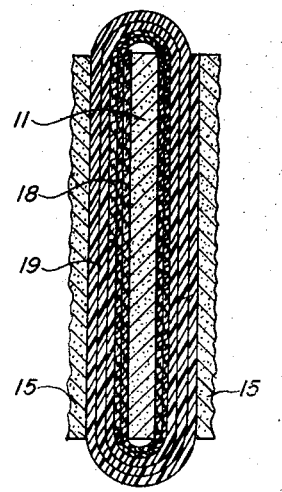

The invention will be explained with reference made to the accompanying drawing wherein:

Fig. 1 is a diagrammatic view, partly in section, of a rechargeable battery embodying the invention; and Fig. 2 is an enlarged view taken on lines 2—2 of Fig. 1 and showing in detail the relationship of electrodes, separator, and inter-separator.

In Fig. 1 a battery according to the invention is diagrammatically shown. The battery comprises a number of positive electrodes 11 which may be silver oxide each wrapped in an envelope 12 formed of inter-separator material and separator material. The envelope 12 encloses said electrodes and is bent in the form of a U having two arms 13 and 14. Between the arms of the U and between the U's the negative electrodes 15 which may be of zinc are inserted. The electrode assembly is held in a container 16 and is impregnated with an alkaline electrolyte 25, such as an aqueous solution of potassium hydroxide, adapted to exert a swelling or dilating action on the separator material. The electrodes are connected by leads 23 and 24 to terminals 21 and 22.

In Fig. 2 the relationship of a positive electrode to the surrounding envelopes is shown by a transverse cross-section through these elements taken on line 2—2 of Fig. 1. The positive electrode 11 comprises an electropositive substance, which may be a silver base. The positive electrode is contained in a wrapper or envelope which in the embodiment shown consists of one or two laminations of inter-separator material 18. These laminations are in turn enveloped or wrapped in one or more cellophane separator sheet elements 19. The outermost layer of the separator sheet 19 is adjacent negative electrodes 15.

In electrical batteries it is essential to keep each corresponding positive and negative electrode close to each other yet separate from each other while allowing charge-carrying ions and electrolyte solution to pass therebetween.

Workers skilled in the art have therefore sought materials which will fulfill this function. Electrolyte-permeable non-porous spacers or separator are used between the different electrodes in alkaline batteries such as silver-zinc batteries. These separators are generally made of a semi-permeable, substantially homogeneous organic sheet material known as cellophane, which is a regenerated cellulose formed by coagulating an NaOH-rich aqueous solution of viscose material, which is an aged cellulose xanthate, in a bath of sodium acid sulfate. Such spacers, however, do not have a long life or period of usefulness and are especially sensitive to repeated cycles of charge and discharge. Such material, when used alone as a separator in an alkaline battery or accumulator such as a silver-zinc cell, seldom serves for more than 60 cycles of charge and discharge without significant change in capacity. Therefore, accumulators using only such material as a separator are limited in their utility as secondary batteries.

The mechanical stress due to the wrapping of an electrode in such separator material, combined with the dissolving action on the separator material by the electrolyte and the chemical action on the separator material by the positive electrode surface, usually a highly active oxidizing agent held in direct contact with the separator material, results in deterioration of the electrode wrappers. This in turn permits drop-out of electrochemically active material from the electrodes and development of short circuits through the deteriorated portions of the separator, as evidenced by loss of capacity over a period of time, especially after repeated charge and discharge of cells using only such material as separators.

Attempts have been made to protect the separator material by interposing inter-separators composed of relatively chemically inert materials between the semi-permeable separator material and the electrode surface from whose action it is desired to protect the separator material.

Materials used as interseparators heretofore have included sheets of natural cellulosic paper and blotting paper. These materials mechanically protect the separator material from direct contact with and chemical action by the electrode surfaces and thus preserve to a limited degree the desired characteristics of semi-permeability of the separator for longer times and/or repeated cycles of charge and discharge, without appreciably increasing the internal resistance of the cell. However, these interseparators are themselves attacked; deterioration of the cell and of the cell performance follows.

Other materials of greater resistance to chemical action such as sheets of polyvinyl alcohol may provide undesirably high internal resistance if used as interseparators.

Because of low susceptibility to the chemical action met within the battery, porous materials such as nylon (a hexamethylene diamine of adipic acid polymer of molecular weight of more than 10,000) cloth may be used as interseparators. These better protect the semi-permeable materials separating the electrodes in alkaline batteries such as the silver-zinc cell for longer periods than do the above-mentioned cellulose products. However, such nylon materials have the characteristic of not being readily wetted by the alkaline electrolyte. This reduces the amount of effective electrode surface directly exposed to the solution, which in turn increases the time necessary for charge of a battery cell using such material as an inter-separator over that necessary for charge of a battery cell using the conventional cellulosic interseparator. The use of relatively non-wetting interseparators (such as nylon) also lowers the efficiency of such battery cells on discharge. Further, such materials used in contact with a battery electrode results in only poor irrigation of the electrode by the electrolyte; thereby such electrodes are only very slowly brought to active condition on addition of electrolyte thereto. This delay substantially prevents the use of batteries using such type of material as interseparators in primary batteries designed to be quickly activated. Further still, the additional non-wetting material increases the distance and decreases the cross-sectional area between the electrodes and thereby increases the internal resistance of the battery.

The natural cellulosic material is readily wetted. When in the electrolyte it may swell to about two to three times its original thickness if its expansion is not mechanically limited. Natural cellulose is known to have three hydroxyl groups on each monomer of the polymeric cellulose molecule. As above mentioned such cellulosic materials are effective as electrode interseparators although not long lasting. It has been observed that deterioration of the fibers of cellulose by oxidizing agents is due primarily to attack on the amorphous uncrystallized portions of the fiber with the result that these fibers deteriorate before the crystallized portions have been severely damaged. Therefore, a highly crystallized or oriented cellulosic material would be expected to be more resistant to the highly oxidizing action of positive electrodes such as the silver-peroxide-containing electrode of the silver-zinc alkaline cell, thus providing a long-lasting interseparator.

Further, an interseparator composed of a polymer with many hydrophilic groups thereon, such as the hydroxyl groups in natural cellulose, should be readily wetted by water, as is cellulose, and provide good irrigation to the electrode with which it contacts in the battery cell.

We have determined that unexpectedly good results are obtained with interseparators formed from certain regenerated cellulosic materials. This is contrary to the teaching of the prior art and contrary to the observations of attacks on cellophane, which is also a regenerated cellulose, by the chemical agents in an alkaline battery.

As a protective agent for cellophane or other semi-permeable, substantially homogeneous sheet material which is electrolyte permeable in alkaline battery electrolyte, we use a material of the same general chemical composition as the readily attacked cellophane. The particular regenerated cellulose which we use as interseparator is one chosen with particular characteristics of wettability and crystallinity not heretofore noted in the battery art as important but which we have determined to be critical. We have found that unexpectedly good results are obtained by using such regenerated cellulose material having these characteristics as interseparators in direct contact with positive electrodes in an alkaline silver-zinc cell with a cellophane separator.

Specifically, we use tensile strength as a guide to crystallinity. We find the tensile strength of a completely saponified cellulose acetate yarn, sold under the name of Fortisan and made by completely saponifying cellulose acetate while under tension, to be about 135,000 p.s.i. and that such regenerated cellulose has a highly crystalline structure. This figure for tensile strength compares favorably with the known tensile strength of cellulose fibers (40,000 p.s.i.). As natural cellulose fibers are known to be highly crystallized, the tensile strength of Fortisan indicates a definite lack of amorphous regions therein. As this material is about 100% saponified, according to our observations it should be highly wettable as well as resistant to chemical attack.

Referring again to the attached drawing for illustration, we used such saponified crystalline cellulose product in the form of a woven cloth having 100 threads per linear inch as interseparator 18 in a silver-zinc alkaline cell with cellophane separator 19 and found that the cell with such interseparator provided over 100 cycles of charge and discharge without significant decrease in capacity, without deterioration of the separator material and with excellent efficiencies surpassing those obtained by previously used separator and interseparator materials.

The saponified and highly oriented cellulose has a high electrolyte absorption, i.e. about 217 parts of alkaline electrolyte are absorbed by 100 parts of such separator material in three seconds. The liquor absorption of nylon is less than 10% and of cellulose products such as viscose rayon less than 20% under corresponding conditions. Use of such hydrolyzed (or saponified) material as interseparator therefore serves to keep the adjacent electrode and electrolyte in excellent contact and available to each other for electrochemical reactions. It thus makes an alkaline silver-zinc battery with cellophane separators usable as a quickly activated primary as well as a long-life secondary battery whose internal resistance is substantially as low as one without an interseparator.

The increased resistance of the highly crystallized regenerated cellulose to chemical attack, as occurs in a silver-zinc cell, over that of cellophane (also a regenerated—but not highly crystallized—cellulose) is shown by the following test:

Boil a concentrated (44%) KOH aqueous solution saturated with $Ag_2O_2$ for 10 minutes and immerse therein a sheet of cellophane. The solution dissolves a sufficient quantity of the cellulosic material to neutralize 1.55 cc. of 0.038 molar $KMnO_4$ for each gram of cellulosic material so treated. Similar treatment with Fortisan fabric provides a solution wherein is dissolved only sufficient cellulosic material to neutralize 0.78 cc of 0.038 molar $KMnO_4$ for each gram of cellulose material so treated.

The advantage of the use of a material of such high crystal orientation and high electrolyte absorption is shown by the following series of tests which were performed as follows: Silver-zinc cells using aqueous 44% KOH as electrolyte, cellophane as the separator applying a pressure of about 20 kg./$dm.^2$ to the electrodes due to its swelling in the electrolyte, and Fortisan fabric as the interseparator material immediately adjacent the positive electrode were charged at one-day rate and discharged at a 2-hour rate. Similar conventional cells with conventional material in contact with the positive electrode, i.e. with nylon fabric of similar weave and fiber size as interseparator, were similarly used and tested and the data of the following Table of Results thus obtained. It is seen that in each case a higher capacity in the cells resulted from use of the highly crystallized hydroxylated material as interseparator.

TABLE OF RESULTS

*Fortisan vs. conventional interseparator*

| Interseparator | Input, Amp. Hrs. | Output, Amp. Hrs. | Voltage, per cell | Efficiency, Percent | Plate size, in. x in. |
|---|---|---|---|---|---|
| Fortisan | 105 | 133 | 1.5 | 98.1 | 8 x 2½ |
| Conventional | 98 | 71 | 1.5 | 72.5 | 8 x 2½ |
| Fortisan | 112 | 107.8 | 1.5 | 96 | 8 x 2½ |
| Conventional | 112 | 93.6 | 1.5 | 82.5 | 8 x 2½ |
| Fortisan | 19 | 18.0 | 1.37 | 99 | 2 x 2¼ |
| Conventional | 15 | 14.3 | 1.35 | 95.5 | 2 x 2¼ |
| Fortisan | 23 | 22.8 | 1.43 | 99 | 2 x 2¼ |
| Conventional | 21 | 16.0 | 1.43 | 76.1 | 2 x 2¼ |

While we have specifically shown that increased life and efficiency results from the use of the saponified and crystallized cellulose as interseparator in direct contact with the highly oxidizing surface of the positive electrode in the Ag-Zn alkaline battery cell, it is clear that such material is usable as interseparator adjacent the positive plate of other alkaline battery cells such as in the nickel-cadmium batteries and iron-nickel batteries.

We claim:

1. An alkaline battery comprising a casing containing at least one negative electrode, at least one positive electrode, an alkaline electrolyte, and between said positive and negative electrodes a separator including a permeable layer of highly crystalline, regenerated-cellulose polymer.

2. The battery according to claim 1 wherein said polymer is Fortisan.

3. An interelectrode separator for alkaline electrochemical cells comprising at least one permeable layer of a highly-crystalline regenerated-cellulose polymer.

4. A separator according to claim 3 wherein the polymer has an electrolyte-absorption capacity in excess of the dry weight of the polymer.

5. A separator according to claim 3 wherein the polymer is in fibrous form.

6. A separator according to claim 3 wherein the layer consists of a fibrous fabric.

7. An interelectrode separator system for alkaline batteries comprising at least one layer of semipermeable material and at least one permeable layer of highly crystalline regenerated-cellulose fibers.

8. A separator according to claim 7 wherein the semipermeable material is chosen from the group consisting of cellophane and polyvinyl alcohol, said permeable layer comprising Fortisan.

References Cited in the file of this patent

UNITED STATES PATENTS

| | | |
|---|---|---|
| 2,130,948 | Carothers | Sept. 20, 1938 |
| 2,270,200 | Upright | Jan. 13, 1942 |
| 2,534,336 | Cahoon | Dec. 19, 1950 |
| 2,571,927 | Neumann et al. | Oct. 16, 1951 |
| 2,591,755 | Wilson | Apr. 8, 1952 |
| 2,610,219 | Yardeny | Sept. 9, 1952 |
| 2,624,768 | Toulmin | Jan. 6, 1953 |
| 2,635,127 | Yardeny | Apr. 14, 1953 |
| 2,701,271 | Mautner | Feb. 1, 1955 |

OTHER REFERENCES

Hackh's Chemical Dictionary, The Blakiston Company, Philadelphia, 1950, Ed. 3, page 756.

Sherman, J. V. and S. L.: "The New Fibers," Van Nostrand, New York, 1946, pages 43 and 279.